US007966692B2

(12) United States Patent
Kim

(10) Patent No.: US 7,966,692 B2
(45) **Date of Patent: *Jun. 28, 2011**

(54) MULTI-CYCLONE DUST COLLECTOR FOR VACUUM CLEANER AND VACUUM CLEANER EMPLOYING THE SAME

(75) Inventor: Tak-soo Kim, Gwangju (KR)

(73) Assignee: Samsung Gwangju Electronics Co. Ltd., Gwangju (KR)

( * ) Notice: Subject to any disclaimer, the term of this patent is extended or adjusted under 35 U.S.C. 154(b) by 1542 days.

This patent is subject to a terminal disclaimer.

(21) Appl. No.: 11/349,665

(22) Filed: Feb. 8, 2006

(65) Prior Publication Data

US 2007/0079587 A1 Apr. 12, 2007

(30) Foreign Application Priority Data

Oct. 11, 2005 (KR) ........................ 10-2005-0095417

(51) Int. Cl.
*B01D 45/12* (2006.01)

(52) U.S. Cl. ............................... 15/353; 55/337; 55/345

(58) Field of Classification Search .................... 15/353; 55/337, 345, 429, 472, 482, DIG. 3
See application file for complete search history.

(56) References Cited

U.S. PATENT DOCUMENTS 4,373,228 A * 2/1983 Dyson ............................. 15/350
6,388,705 B1 5/2002 Kawahara et al. ............ 348/208
6,607,572 B2 8/2003 Gammack et al. .............. 55/343
7,294,159 B2 * 11/2007 Oh et al. .......................... 55/343
7,297,172 B2 * 11/2007 Lee ................................. 55/337
7,326,268 B2 * 2/2008 Oh et al. .......................... 55/343
7,361,200 B2 * 4/2008 Oh et al. .......................... 55/343
7,438,737 B2 * 10/2008 Song et al. ....................... 55/343
7,547,336 B2 * 6/2009 Fester et al. ..................... 55/337
7,547,351 B2 * 6/2009 Oh et al. .......................... 95/271
7,556,662 B2 * 7/2009 Lee et al. ......................... 55/345
7,582,129 B2 * 9/2009 Kim et al. ........................ 55/345
(Continued)

FOREIGN PATENT DOCUMENTS

CN 1548245 11/2004
(Continued)

OTHER PUBLICATIONS

Search report dated Mar. 6, 2007 from corresponding EP 06290414.9.

*Primary Examiner* — Shay L Karls
(74) *Attorney, Agent, or Firm* — Ohlandt, Greeley, Ruggiero & Perle, LLP

(57) ABSTRACT

The present invention relates to a multi-cyclone dust collector and a vacuum cleaner employing the same that forms an upwardly whirling air current so as to separate contaminants. The multi-cyclone dust collector for the vacuum cleaner includes a first cyclone unit causing dust-laden air sucked through a lower portion of the first cyclone unit to form a first upwardly whirling air current so as to separate contaminants from the dust-laden air by centrifugal force, and a second cyclone unit disposed under the first cyclone unit and making partially clean air, which is discharged from the first cyclone unit and then sucked in a lower portion of the second cyclone unit, to form a second upwardly whirling air current so as to separate dust from the partially clean air by centrifugal force.

13 Claims, 6 Drawing Sheets

U.S. PATENT DOCUMENTS

| | | | | |
|---|---|---|---|---|
| 7,597,730 | B2 * | 10/2009 | Yoo et al. | 55/337 |
| 7,678,166 | B2 * | 3/2010 | Yoo et al. | 55/345 |
| 7,722,693 | B2 * | 5/2010 | Yoo et al. | 55/345 |
| 2004/0144070 | A1 * | 7/2004 | Gammack et al. | 55/343 |
| 2005/0138763 | A1 * | 6/2005 | Tanner et al. | 15/353 |
| 2006/0042039 | A1 * | 3/2006 | McDowell et al. | 15/353 |
| 2006/0123590 | A1 * | 6/2006 | Fester et al. | 15/353 |
| 2006/0230718 | A1 * | 10/2006 | Han et al. | 55/345 |
| 2007/0079579 | A1 * | 4/2007 | Eddington et al. | 55/337 |
| 2007/0079582 | A1 * | 4/2007 | Oh | 55/345 |
| 2007/0084160 | A1 * | 4/2007 | Kim | 55/345 |

FOREIGN PATENT DOCUMENTS

| | | | |
|---|---|---|---|
| DE | 20306405 | | 10/2003 |
| EP | 1371318 | A2 | 2/2003 |
| KR | 1020050025711 | | 3/2005 |

* cited by examiner

MULTI-CYCLONE DUST COLLECTOR FOR VACUUM CLEANER AND VACUUM CLEANER EMPLOYING THE SAME

CROSS-REFERENCE TO RELATED APPLICATIONS

This application claims the benefit under 35 U.S.C. §119 (a) of Korean Patent Application No. 2005-95417 filed on Oct. 11, 2005 in the Korean Intellectual Property Office, the contents of which is incorporated herein by reference in its entirety.

BACKGROUND OF THE INVENTION

1. Field of the Invention

The present invention relates to a vacuum cleaner. More particularly, the present invention relates to a multi-cyclone dust collector for a vacuum cleaner.

2. Description of the Related Art

Generally, a vacuum cleaner sucks dust-laden air that contains contaminants such as dust or dirt by suction force generated by a vacuum generator. When the dust-laden air passes through a dust collecting apparatus disposed in a main body of the vacuum cleaner, contaminants are separated from the dust-laden air and collected in the dust collecting apparatus. Then, clean air is discharged out of the vacuum cleaner.

The dust collecting apparatus that separates and collects contaminants from the dust-laden air may employ a dust bag, a cyclone dust collector, and so on. Currently, the cyclone dust collectors providing semi-permanent use have become widespread.

The conventional cyclone dust collector includes a cyclone body, an air inlet, and an air outlet. The cyclone body is formed in a cylindrical shape for the sucked air to whirl around therein. The air inlet is disposed at a side of an upper portion of the cyclone body in a tangential direction to the cyclone body for the air sucked through the air inlet to whirl downwards easily. The air outlet is disposed at an upper end of the cyclone body to guide the air, which whirls downwards and then rises up in the inside of the cyclone body, out of the cyclone dust collector.

However, in the conventional cyclone dust collector, the air whirling downwards collides with the air rising up in the cyclone body because both the air inlet and the air outlet are disposed at the upper portion of the cyclone body. Collision between the rising air and descending air decreases a dust collecting efficiency of the cyclone dust collector.

Furthermore, the conventional cyclone dust collectors cannot separate fine contaminants. In order to overcome the problem described above, the same applicant has invented and disclosed a multi-cyclone dust collector that separates fine contaminants being contained in the sucked air in two stages and provides a higher dust collecting efficiency, in Korean Patent Application No. 10-2003-0062520 (filed Sep. 8, 2003). However, the multi-cyclone dust collector still has a problem: the rising air colliding with the descending air decreases dust collecting efficiency.

Furthermore, in the conventional cyclone dust collector, a dust receptacle collecting contaminants is disposed below the cyclone body to share a same space with the cyclone body. Therefore, the contaminants being collected in the dust receptacle may flow back to the air outlet by the air that descends and then rises up in the cyclone body. The flow back of the collected contaminants deteriorates the dust collecting efficiency.

SUMMARY OF THE INVENTION

The present invention has been developed in order to overcome the above drawbacks and other problems associated with the conventional arrangement. An aspect of the present invention is to provide a multi-cyclone dust collector for a vacuum cleaner and a vacuum cleaner employing the same that can separate and collect fine contaminants and has a high dust collecting efficiency because air collision does not occur.

Another object of the present invention is to provide a compact multi-cyclone dust collector and a vacuum cleaner employing the same.

The above object and/or other objects of the present invention can substantially be achieved by providing a multi-cyclone dust collector for a vacuum cleaner, which comprises a first cyclone unit taking dust-laden air sucked into a lower portion of the first cyclone unit to form a first upwardly whirling air current so as to separate contaminants from the dust-laden air by centrifugal force; and a second cyclone unit disposed under the first cyclone unit, the second cyclone unit taking partially clean air, which is discharged from the first cyclone unit and then enters into a lower portion of the second cyclone unit, to form a second upwardly whirling air current so as to separate contaminants from the partially clean air by centrifugal force.

According to embodiment of the present invention, the first cyclone unit comprises, a first cyclone body formed in a hollow cylindrical shape, for the sucked dust-laden air to whirl inside the first cyclone body. An air communicating member is formed in a hollow cylindrical shape, and protruded upward from a center of a partition of the first cyclone body, discharging the partially clean air removed of contaminants to the second cyclone unit; a first dust chamber is formed to wrap around the first cyclone body, collecting contaminants discharged from the first cyclone body; and an air inlet pipe disposed at a lower portion of the first cyclone body, causing the sucked dust-laden air to form an upwardly whirling air current.

The air inlet pipe is disposed in a tangential direction to the first cyclone body through the first dust chamber and in fluid communication with the first cyclone body.

The first cyclone body further comprises a dust discharge opening disposed on the upper portion of a sidewall of the first cyclone body for the contaminants separated from the dust-laden air to be discharged to the first dust chamber through the dust discharge opening.

The air communicating member has an upper end extending to a upper surface of the first cyclone body and a plurality of air holes formed on a surface thereof for discharging the partially clean air.

Preferably, the first cyclone body and the air communicating member are integrally molded by injection molding.

According to an embodiment of the present invention, the second cyclone unit comprises a second cyclone in fluid communication with a bottom end of the air communicating member, causing the partially clean air entered through the air communicating member to form the second upwardly whirling air current wherein the second upwardly whirling air current comprises a plurality of upwardly whirling air currents so as to separate contaminants from the partially clean air; and a second dust chamber wrapping around the second cyclone for collecting contaminants discharged from the second cyclone.

The second cyclone comprises an air guide pipe connected with the air communicating member and having a plurality of distribution paths at a lower side thereof; a plurality of second cyclone bodies formed in a hollow cylindrical shape with a closed bottom end, a lower portion of the plurality of second cyclone bodies connected with each of the plurality of distribution paths; and a plurality of air outlet pipes formed in a hollow cylindrical shape, protruded upward from a center of a lower surface of each of the plurality of second cyclone bodies, and discharging air cleaned in each of the plurality of second cyclone bodies.

The second cyclone unit further comprises an air gathering member disposed under the plurality of second cyclone bodies and gathering air discharged from the plurality of air outlet pipes.

The plurality of second cyclone bodies are arranged in a substantially circular shape based on the air guide pipe.

The second cyclone is integrally molded by injection molding.

A bottom end of each of the first and second dust chambers is open and has a dust cover detachably mounted on the bottom end thereof.

According to another aspect of the present invention, a vacuum cleaner comprises: a vacuum generator generating suction force; a suction brush sucking dust-laden air by the suction force; a multi-cyclone dust collector separating and collecting contaminants from the air sucked through the suction brush. The multi-cyclone dust collector comprises; a first cyclone unit in fluid communication with the suction brush at a lower portion of the first cyclone unit, causing the sucked dust-laden air to form an upwardly whirling air current so as to separate contaminants from the dust-laden air by centrifugal force; and a second cyclone unit disposed under the first cyclone unit, causing partially clean air, which is discharged from the first cyclone unit and then sucked into a lower portion of the second cyclone unit, to form an upwardly whirling air current so as to separate contaminants from the partial clean air by centrifugal force.

The first cyclone unit comprises a first cyclone body formed in a hollow cylindrical shape, for the sucked dust-laden air to whirl inside the first cyclone body; an air communicating member disposed on a center of a partition of the first cyclone body, discharging the partially clean air removed of contaminants to the second cyclone unit; a first dust chamber formed to wrap around the first cyclone body, collecting contaminants discharged from the first cyclone body; and an air inlet pipe disposed at a lower portion of the first cyclone body, causing the sucked dust-laden air to form a first upwardly whirling air current. The second cyclone unit comprises an air guide pipe connected with the air communicating member and having a plurality of distribution paths at a lower side thereof; a plurality of second cyclone bodies formed in a hollow cylindrical shape with a closed bottom end, a lower portion of the plurality of second cyclone bodies connected with each of the plurality of distribution paths; a plurality of air outlet pipes formed in a hollow cylindrical shape, protruded upward from a center of a lower surface of each of the plurality of second cyclone bodies, discharging air cleaned in each of the plurality of second cyclone bodies; and a second dust chamber wrapping around the plurality of second cyclone bodies and collecting contaminants discharged from the plurality of second cyclone bodies.

According to the multi-cyclone dust collector for vacuum cleaner and the vacuum cleaner as described above, dust collecting efficiency increases because sucked air and discharging air do not collide with each other inside the first and second cyclone units.

According to the multi-cyclone dust collector for vacuum cleaner and the vacuum cleaner as described above, fine contaminants can be separated and collected because dust-laden air passes in order through the first cyclone unit and the second cyclone unit.

According to the multi-cyclone dust collector for vacuum cleaner and the vacuum cleaner as described above, dust collecting efficiency for separating and collecting contaminants is substantially higher than conventional cyclone units because a space forming an upwardly whirling air current is separated from a contaminants collecting space in each of the first and second cyclone units.

According to the multi-cyclone dust collector for a vacuum cleaner and the vacuum cleaner as described above, the arrangement where the second cyclone unit is disposed under the first cyclone unit can decrease the diameter of the multi-cyclone dust collector, making it smaller than that of the conventional multi-cyclone dust collector. Therefore, a compact multi-cyclone dust collector can be provided.

According to the multi-cyclone dust collector for a vacuum cleaner and the vacuum cleaner as described above, the number of parts and time for assembling the multi-cyclone dust collector can be reduced because some parts of each of the first and second cyclone units can be molded integrally by injection molding. Therefore, manufacturing cost decreases.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

Throughout the drawings, like reference numerals will be understood to refer to like parts, components and structures.

DETAILED DESCRIPTION OF THE INVENTION

Hereinafter, certain exemplary embodiments of the present invention will be described in detail with reference to the accompanying drawings.

The matters defined in the description, such as a detailed construction and elements thereof, are provided to assist in a comprehensive understanding of the invention. Thus, it is apparent that the present invention may be carried out without those defined matters. Also, well-known functions or constructions are omitted to provide a clear and concise description of exemplary embodiments of the present invention.

Figure 1:
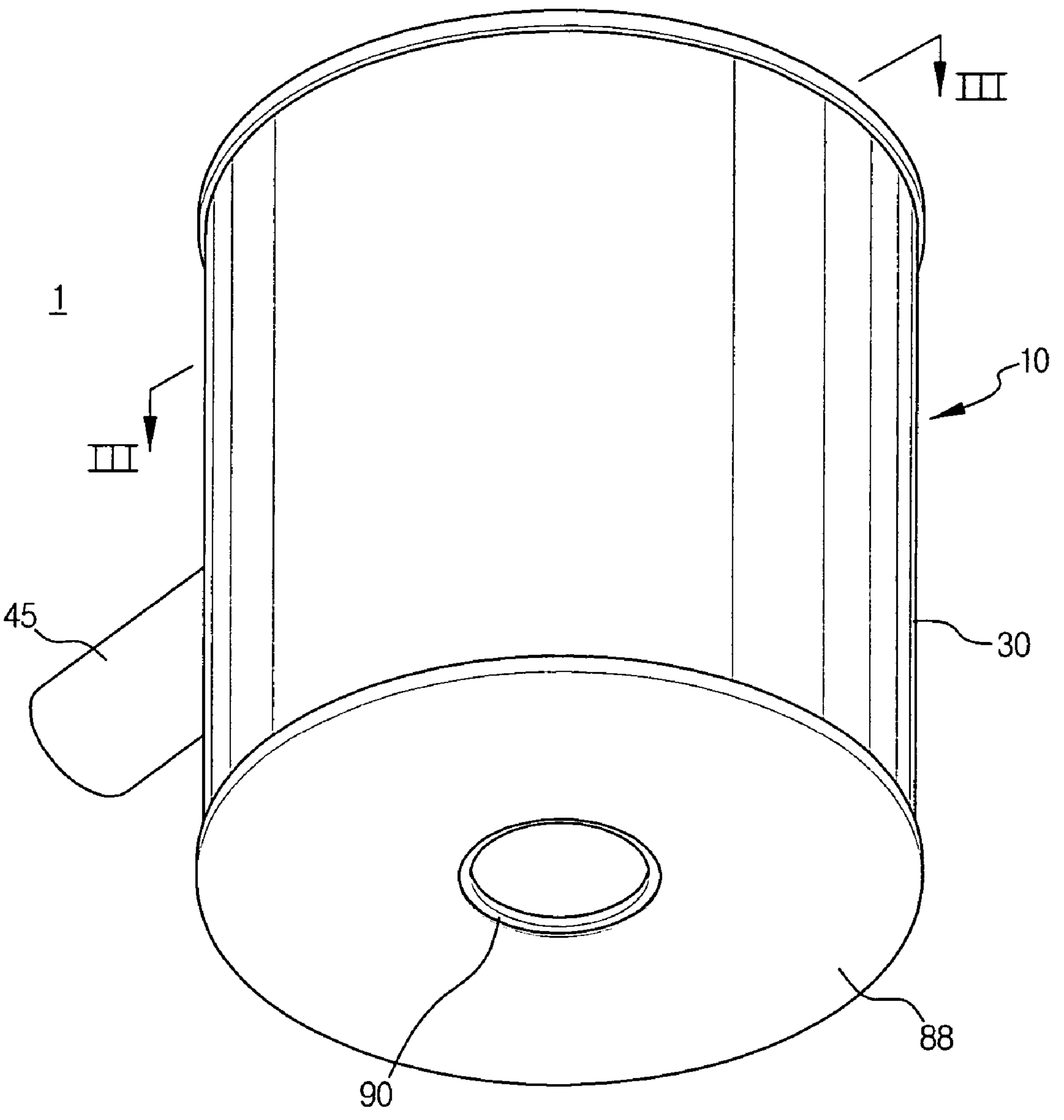
FIG. 1 is a perspective view illustrating a multi-cyclone dust collector for a vacuum cleaner according to an embodiment of the present invention.
Figure 2:
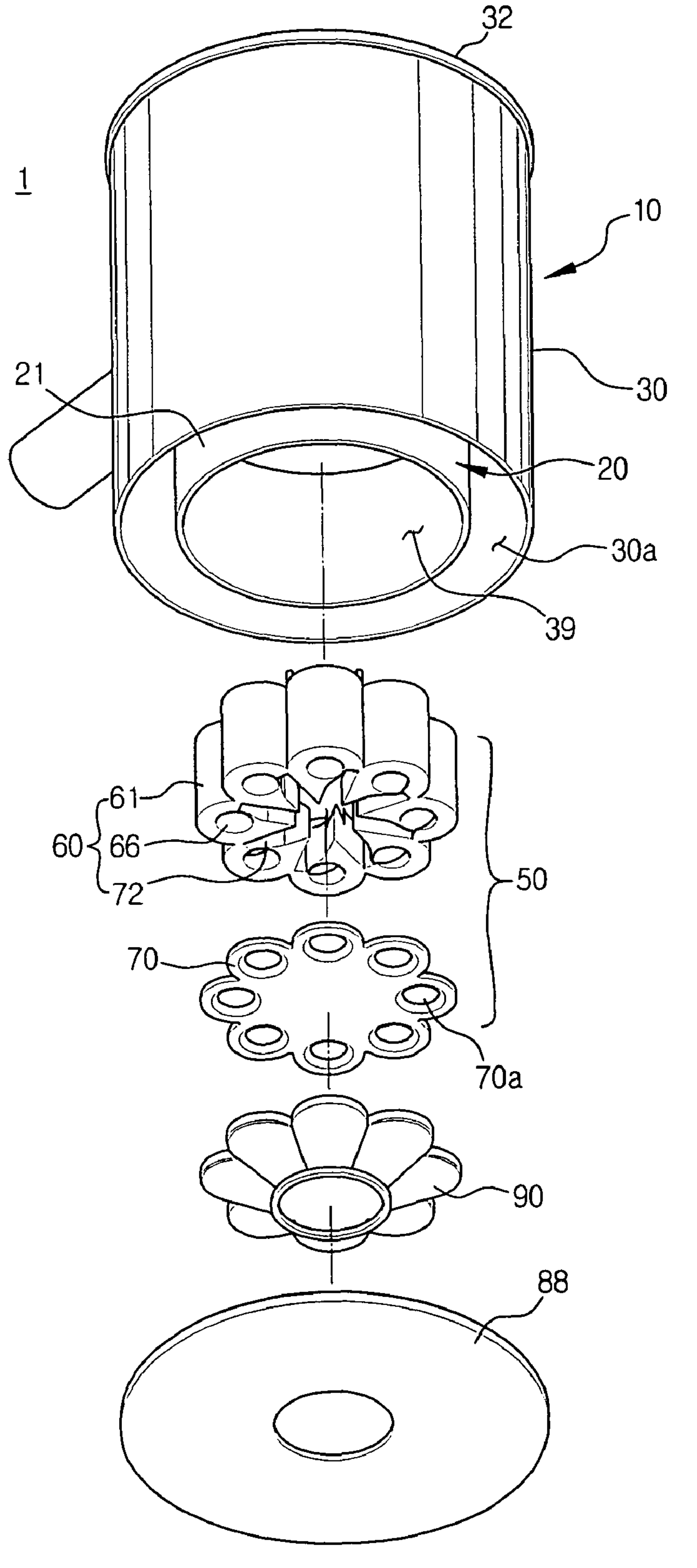
FIG. 2 is an exploded perspective view illustrating the multi-cyclone dust collector as shown in FIG. 1.
Figure 3:
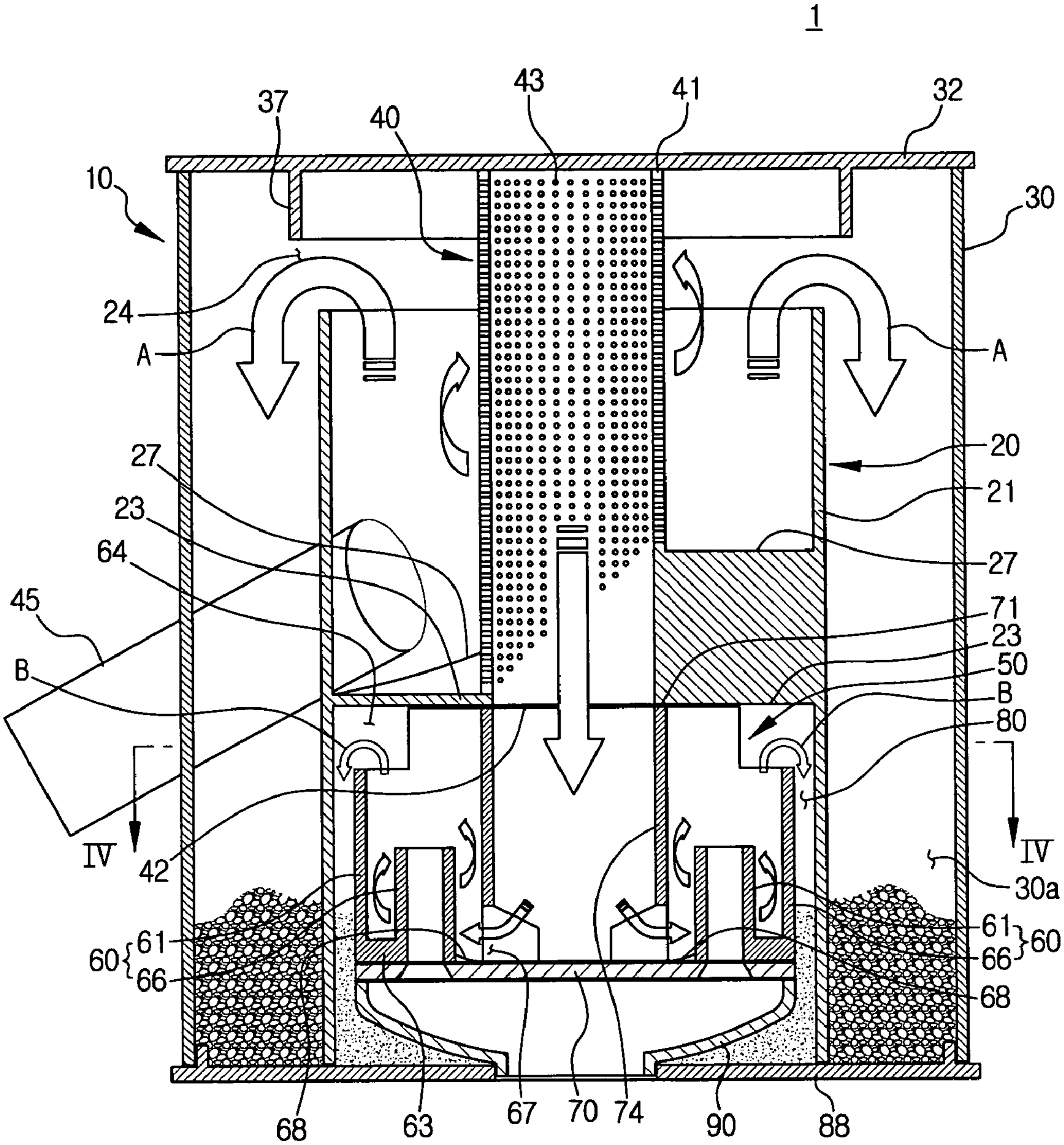
FIG. 3 is a sectional view of the multi-cyclone dust collector of FIG. I taken along a line III-III in FIG. 1.

Referring to FIGS. 1 to 3, a multi-cyclone dust collector 1 according to an embodiment of the present invention includes a first cyclone unit 10 and a second cyclone unit 50.

The first cyclone unit 10 takes air, which is sucked through a suction brush 110 (see FIG. 6) and contains contaminants (hereinafter, referred to as a dust-laden air), and forces the air to enter into a lower portion of the first cyclone unit 10 and whirl upwards so that contaminants are separated from the dust-laden air by the centrifugal force operating upon the whirling dust-laden air current. In other words, the first cyclone unit 10 forms the dust-laden air entering into the lower portion thereof into an upwardly whirling air current, thereby centrifugally separating contaminants from the dust-laden air.

The first cyclone unit 10 includes a first cyclone body 20, an air-communicating member 40, a first dust receptacle 30, and an air inlet pipe 45.

The first cyclone body 20 is formed in a hollow cylindrical shape being divided by a partition 23. The dust-laden air sucked through the air inlet pipe 45 rotates and forms the upwardly whirling air current in a space inside the first cyclone body 20. An upper cover 32 covers a top end of the first cyclone body 20 so that the upper cover 32 forms an upper surface of the first cyclone body 20. A dust discharge opening 24 is formed between a top end of a sidewall 21 of the first cyclone body 20 and the upper cover 32. The contaminants separated from the dust-laden air by the centrifugal force in the first cyclone body 20 are discharged to a first dust chamber 30*a* through the dust discharge opening 24. Furthermore, a backflow preventing dam 37 is preferably disposed on a lower side of the upper cover 32 for preventing contaminants being collected in the first dust chamber 30*a* from flowing back into the first cyclone body 20 through the dust discharge opening 24. The backflow preventing dam 37 is preferably formed in a cylindrical shape having a greater diameter than a diameter of the first cyclone body 20. A sloping surface 27 is formed on an upper side of the partition 23 of the first cyclone body 20 being connected with the air inlet pipe 45.

The air communicating member 40 discharges air that has the contaminants removed from the dust-laden air by the centrifugal force (hereinafter, referred to as partially clean air) in the first cyclone body 20 into the second cyclone unit 50. The air communicating member 40 is formed in a hollow cylindrical shape and is projected upward on a center of the partition 23 of the first cyclone body 20. A top end 41 of the air communicating member 40 extends to touch the upper cover 32. Therefore, the top end 41 of the air communicating member 40 is closed with the upper cover 32 and a bottom end 42 thereof is open. The air communicating member 40 also has on the surface thereof a plurality of air holes 43 for the partially clean air to enter through. The plurality of air holes 43 has a small diameter so that they filter large contaminants moving to the air communicating member 40 with the partially clean air. Even though the air communicating member 40 according to the exemplary embodiment of the present invention has the top end 41 reaching the upper cover 32, this is for illustrative purposes only. Alternatively, the air communicating member 40 may have the top end 41 apart from the upper cover 32 so as to be open.

The first dust receptacle 30 is formed to wrap around the first cyclone body 20. A space between the sidewall 21 of the first cyclone body 20 and the first dust receptacle 30 forms the first dust chamber 30*a* and collects the contaminants being discharged from the first cyclone body 20 by the centrifugal force. The first dust receptacle 30 is formed in a cylindrical shape having a greater diameter than a diameter of the first cyclone body 20. Even though each of two separate lids cover a top end of the first dust receptacle 30 and the top end of the first cyclone body 20, it is preferable that an upper cover 32 covers the top ends of the first dust receptacle 30 and the first cyclone body 20 as the exemplary embodiment of the present invention as shown FIG. 3. Furthermore, a bottom end of the first dust receptacle 30 extends downwards over the partition 23 of the first cyclone body 20. The second cyclone unit 50 is disposed at a cylindrical space 39 (see FIG. 2) below the partition 23 of the first cyclone body 20. A dust cover 88 is disposed on the bottom end to separate from and mount to the first dust receptacle 30. The dust cover 88 forms a lower surface of the first dust chamber 30*a*.

The air inlet pipe 45 is in fluid communication with the suction brush 110 (see FIG. 6) and is disposed at a lower portion of the first cyclone body 20 so that the dust-laden air entering the first cyclone body 20 forms an upwardly whirling air current. In other words, the air inlet pipe 45 is disposed to be tangential to the first cyclone body 20 in an upward inclined direction and in fluid communication with the first cyclone body 20 so that the dust-laden air sucked through the suction brush 110 forms the upwardly whirling air current inside the first cyclone body 20. The sloping surface 27 that is inclined upwards is formed on the partition 23 of the first cyclone body 20 that is connected with the air inlet pipe 45. The sloping surface 27 assists the air entering through the air inlet pipe 45 to easily form the upwardly whirling air current. The air inlet pipe 45 is disposed through the first dust receptacle 30 and connected with the first cyclone body 20.

The second cyclone unit 50 takes the partially clean air discharged from the first cyclone unit 10 and forces the partially clean air to enter through a lower portion of the second cyclone unit 50 and whirl upwardly so that fine contaminants are separated from the partially clean air by the centrifugal force operating upon the whirling partially clean air. Then the second cyclone unit 50 discharges clean air with the fine contaminants removed, to the vacuum generator 131 (see FIG. 6). Here, the partially clean air contains fine contaminants not removed in the first cyclone unit 10, so the second cyclone unit 50 removes the fine contaminants from the partially clean air.

Figure 4:
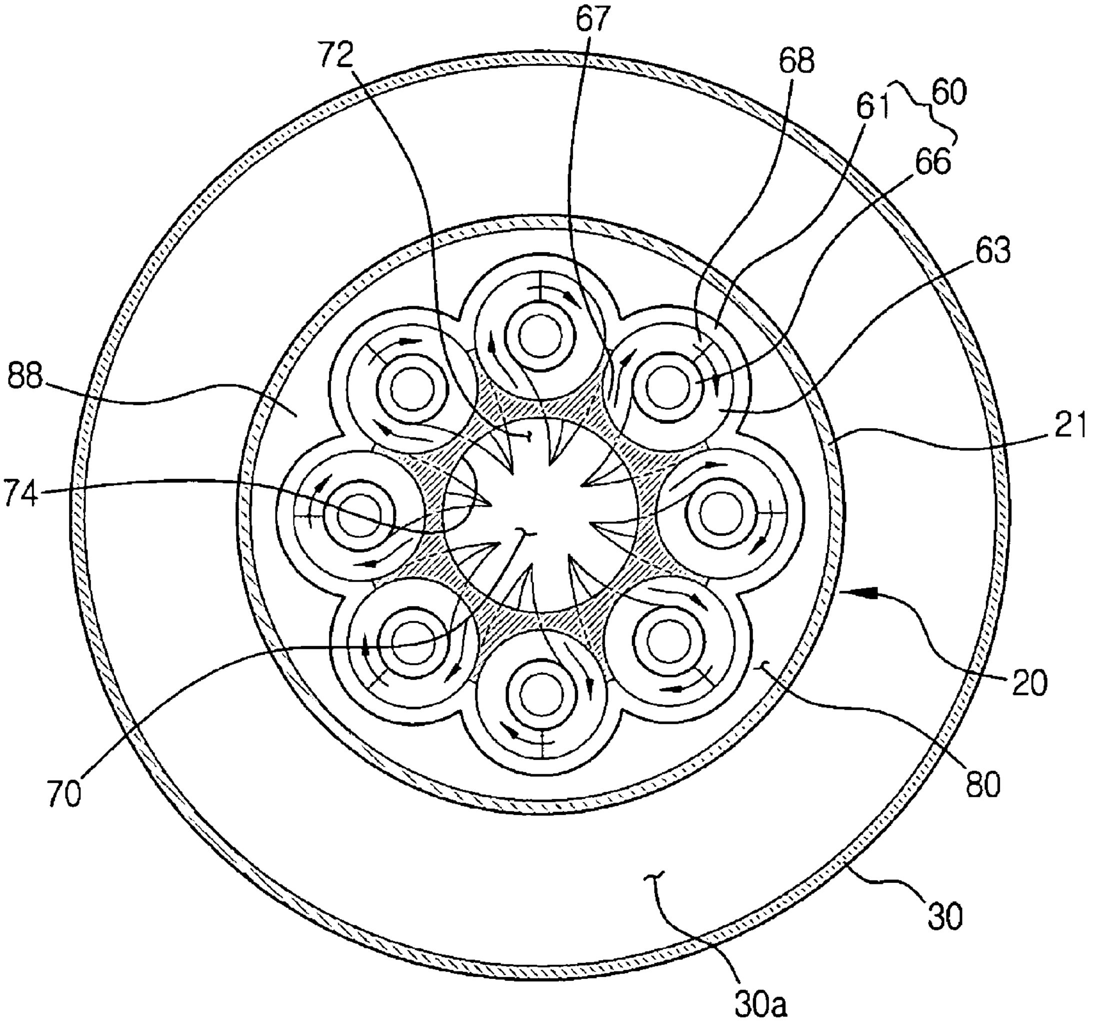
FIG. 4 is a sectional view of the multi-cyclone dust collector of FIG. 3 taken along a line IV-IV in FIG. 3.
Figure 5:
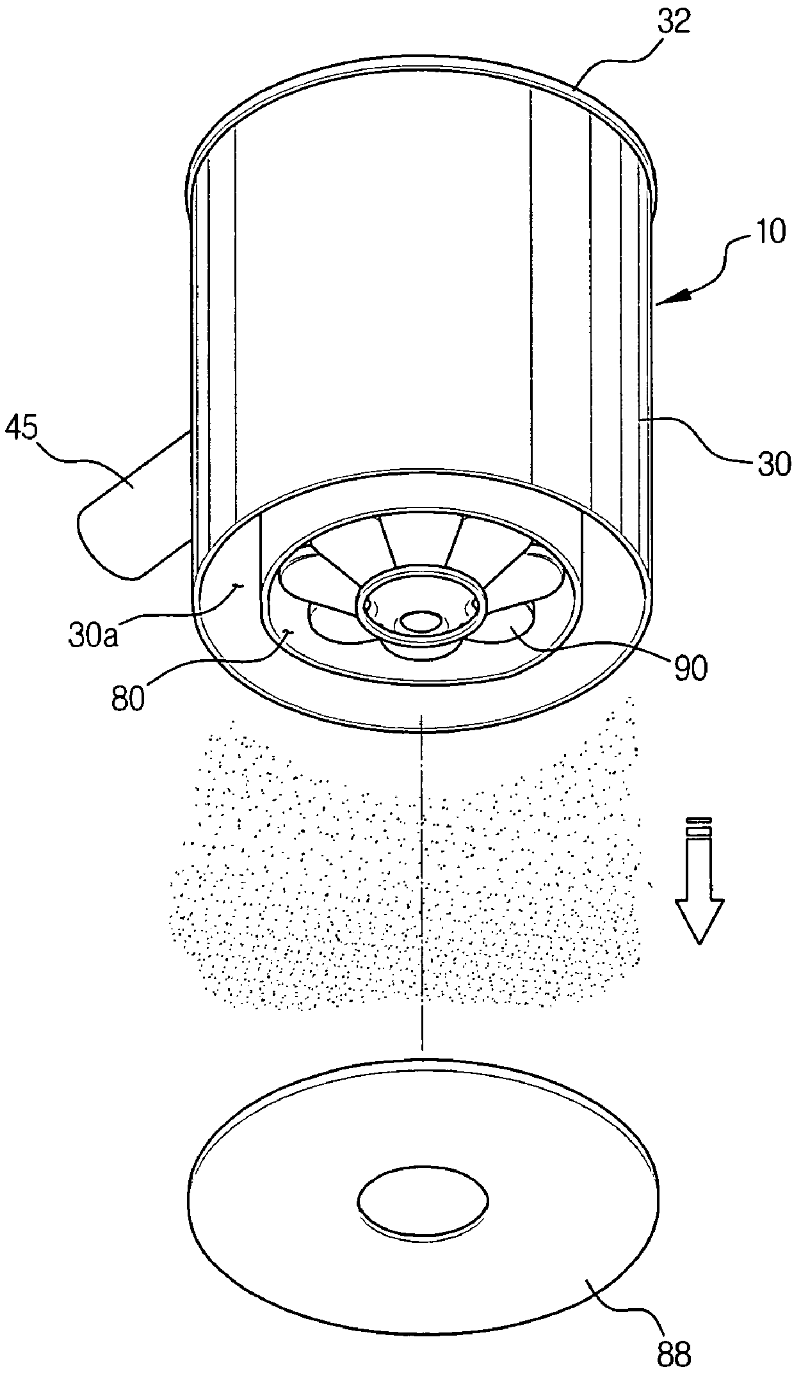
FIG. 5 is a perspective view illustrating that contaminants are discharging from the multi-cyclone dust collector as shown in FIG. 1.

Referring to FIGS. 2 to 4, the second cyclone unit 50 includes a second cyclone 60, a lower plate 70, and a second dust chamber 80.

The second cyclone 60 is disposed under the first cyclone unit 10. The second cyclone 60 sucks the partially clean air discharged from the first cyclone unit 10 through a lower side of second cyclone 60 and causes the sucked partially clean air to form an upwardly whirling air current so that the second cyclone 60 separates fine contaminants from the partially clean air by centrifugal force and discharges clean air to the vacuum generator 131.

The second cyclone 60 includes a plurality of second cyclone bodies 61, a plurality of air outlet pipes 66, an air guide pipe 74, and a plurality of distribution paths 72.

The plurality of second cyclone bodies 61 is formed in a hollow cylindrical shape with a closed bottom end, respectively. A second air inlet 67 in fluid communication with the distribution path 72 is provided at a lower portion of each of the second cyclone bodies 61. The partially clean air enters the second cyclone bodies 61 through the air guide pipe 74 and the distribution path 72 and then forms upward whirling air current inside the second cyclone body 61. A sloping part 68 inclined upwards from the second air inlet 67 is disposed on the lower surface 63 of the second cyclone body 61. Therefore, the partially clean air entering through the second air inlet 67 forms the upwardly whirling air current.

The plurality of air outlet pipes 66 is formed in a hollow cylindrical shape and is projected upwards on a center of the lower surface 63 of the second cyclone body 61, respectively.

The plurality of air outlet pipes 66 is in fluid communication with the vacuum generator 131. Therefore, a top end and a bottom end of the air outlet pipe 66 are open. Clean air with the fine contaminants removed in the second cyclone body 61 by centrifugal force is discharged to the vacuum generator 131 through the air outlet pipe 66.

It is preferable that an air gathering member 90 is disposed under the second cyclone 60 for gathering air being discharged through the plurality of air outlet pipes 66. A bottom end of the air gathering member 90 is in fluid communication with the vacuum generator 131.

The air guide pipe 74 distributes the partially clean air discharged through the air communicating member 40 described above into each of the plurality of second cyclone bodies 61. An end 71 of the air guide pipe 74 connects with the bottom end 42 of the air communicating member 40. The other end of the air guide pipe 74 connects with each of the plurality of second cyclone bodies 61. Therefore, the other end of the air guide pipe 74 is branched into the distribution paths 72 corresponding to the number of the plurality of second cyclone bodies 61 as shown in FIG. 4. Each of the distribution paths 72 connects with the second air inlet 67 of the plurality of second cyclone bodies 61.

The exemplary embodiment of the present invention has 8 second cyclone bodies 61 and some part of each of the 8 second cyclone bodies 61 forms the air guide pipe 74. The lower part of the air guide pipe 74 branches into 8 distribution paths 72 corresponding to the number of the second cyclone bodies 61. Each of the distribution paths 72 guides partially clean air flowing through the air guide pipe 74 to enter each of the 8 second cyclone bodies 61 and to form an upwardly whirling air current.

Furthermore, it is preferable that the plurality of second cyclone bodies 61 of the second cyclone 60 is arranged in a substantially circular shape based on the air guide pipe 74 as shown FIG. 4. It is preferable to form the second cyclone 60 in a shape that can be molded integrally by injection molding.

The lower plate 70 is disposed to cover bottom ends of the second cyclone 60 and the air guide pipe 74, and has a plurality of through holes 70a corresponding to the plurality of air outlet pipes 66. The partially clean air flowing down along the air guide pipe 74 crashes against the lower plate 70 and then enters each of the plurality of second cyclone bodies 61 through the plurality of distribution paths 72.

The second dust chamber 80 wraps entirely around the second cyclone 60, and collects contaminants being discharged from the plurality of second cyclone bodies 61. In the exemplary embodiment according to the present invention, a cylindrical space 39 (see FIG. 2) between the sidewall 21 of the first cyclone body 20 extended below the partition 23 and the dust cover 88 forms the second dust chamber 80. A top end of the second cyclone body 61 is separated from the partition 23 of the first cyclone body 20 forming an upper surface of the second dust chamber 80 so that contaminants separated in the second cyclone body 61 are discharged to the second dust chamber 80 through a gap 64 between the partition 23 of the first cyclone body 20 and the top end of the second cyclone body 61. Furthermore, the sidewall 21 of the first cyclone body 20 forming a side surface of the second dust chamber 80 is separated from the second cyclone body 61. Therefore, contaminants being discharged through the gap 64 from the plurality of second cyclone bodies 61 are collected into the second dust chamber 80 formed by a space between the plurality of second cyclone bodies 61 and the sidewall 21 of the first cyclone body 20. A bottom end of the second dust chamber 80 is closed with the dust cover 88 disposed to mount on or separate from the first dust receptacle 30. Therefore, by separating the dust cover 88, the contaminants collected in the second dust chamber 80 can be discharged. When the air gathering member 90 is disposed below the second cyclone 60 and the lower plate 70 as the exemplary embodiment according to the present invention, the dust cover 88 is disposed below the air gathering member 90.

In the exemplary embodiment according to the present invention, the upper surface and side surface of the second dust chamber 80 are formed by the partition 23 and sidewall 21 of the first cyclone body 20; however, this should not be considered as limiting. The upper surface and side surface of the second dust chamber 80 may be formed by different members not described above.

Hereinafter, operation of the multi-cyclone dust collector 1 for the vacuum cleaner with the above-described structure will be explained with reference to FIGS. 1 to 4.

Upon turning on the vacuum cleaner, the vacuum generator 131 (see FIG. 6) operates to generate suction force. The suction force sucks air, which contains contaminants such as dust or dirt (herein after referring to as dust-laden air) into the suction brush 110 (see FIG. 6). The dust-laden air sucked into the suction brush 110 flows to a multi-cyclone dust collector 1 in fluid communication with the suction brush 110 via a connection member 121 and 122 (see FIG. 6).

The dust-laden air flowing into the multi-cyclone dust collector 1 enters the first cyclone body 20 through an air inlet pipe 45 of a first cyclone unit 10. The dust-laden air entered through the air inlet pipe 45 forms an upwardly whirling air current that whirls and flows upwards inside the first cyclone body 20. At this time, the dust-laden air easily forms the upwardly whirling air current due to a sloping surface 27 disposed before the air inlet pipe 45 inside the first cyclone body 20. Then, contaminants are separated from the dust-laden air by centrifugal force operating upon the upwardly whirling air current. The separated contaminants are discharged into the first dust chamber 30*a* through the dust discharge opening 24 between the first cyclone body 20 and the upper cover 32 as illustrated by arrow A in FIG. 3, and collects in the first dust chamber 30*a*. Therefore, the contaminants collected in the first dust chamber 30*a* do not affect the upwardly whirling air current inside the first cyclone body 20. Air entering the first cyclone body 20 does not collide with air discharging through the plurality of air holes 43 of the air communicating member 40 so that dust collecting efficiency increases.

The air with contaminants removed in the first cyclone body 20 (hereinafter, referring to as partially clean air) enters the air guide pipe 74 of the second cyclone 60 through the plurality of air holes 43 formed on the air communicating member 40. The partially clean air entering the air guide pipe 74 crashes against the lower plate 70, flows along the plurality of distribution paths 72 and then enters a second air opening 67 of each of the plurality of second cyclone bodies 61. The partially clean air entering through the second air opening 67 forms an upwardly whirling air current inside the second cyclone body 61. At this time, the partially clean air easily forms the upwardly whirling air current due to the sloping part 68 disposed before the second air opening 67. Then, fine contaminants are separated from the partially clean air by centrifugal force operating upon the upwardly whirling air current. The separated fine contaminants are discharged through the gap 64 between the partition 23 of the first cyclone body 20 and the top end of the second cyclone body 61 and collect in the second dust chamber 80 (see arrow B in FIG. 3). Therefore, the contaminants collected in the second dust chamber 80 do not affect the upwardly whirling air current inside the second cyclone body 61.

Clean air with the fine contaminants removed in the second cyclone body 61 is discharged through the air outlet pipe 66. At this time, air discharged through the air outlet pipe 66 does not collide with air entering through the second air opening 67 and forming the upwardly whirling air current so that dust collecting efficiency increases.

In each of the plurality of second cyclone bodies 61, clean air, after having the fine contaminants removed by the above-described operation, is discharged through the plurality of air outlet pipes 66. At this time, because bottom ends of the plurality of air outlets 66 of the second cyclone 60 are in fluid communication with the vacuum generator 131 via the air gathering member 90, the clean air passes through the vacuum generator 131 to discharge out of the body 130 of the vacuum cleaner.

When contaminants fill the first and second dust chambers 30*a* and 80, a user can open the dust cover 88 covering the bottom ends of the first and second dust chambers 30*a* and 80, and dump contaminants collected in the first and second dust chambers 30*a* and 80.

Furthermore, when turning downward, the multi-cyclone dust collector 1 according to an exemplary embodiment of the present invention may prevent contaminants collected in the first dust chamber 30*a* from flowing back to the first cyclone body 20 through the dust discharge opening 24 because the multi-cyclone dust collector 1 has the backflow preventing dam 37 disposed on the upper cover 32.

Hereinafter, a vacuum cleaner 100 having a multi-cyclone dust collector 1 according to an embodiment of the present invention will be explained with reference to FIG. 6.

Figure 6:
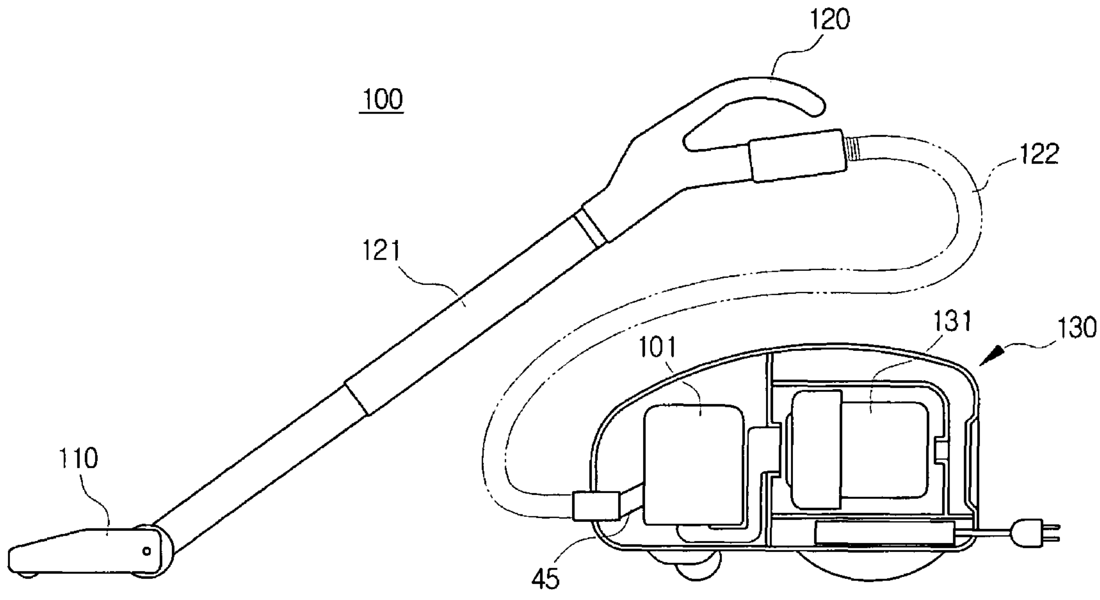
FIG. 6 is a view illustrating a vacuum cleaner employing a multi-cyclone dust collector according to an embodiment of the present invention.

Referring to FIG. 6, the vacuum cleaner 100 according to an embodiment of the present invention includes a suction brush 110, an extension pipe 121, a flexible hose 122, and a cleaner body 130.

The suction brush 110 has at bottom surface a dust suction opening that sucks dust-laden air from the cleaning floor.

The extension pipe 121 and the flexible hose 122 make the suction brush 110 in fluid communication with the cleaner body 130. A handle 120 is disposed at an upper portion of the extension pipe 121.

The cleaner body 130 includes a vacuum generator 131 and a multi-cyclone dust collector 101. The vacuum generator 131 generates a suction force to suck dust-laden air via the suction brush 110, and is in fluid communication with the multi-cyclone dust collector 101. The multi-cyclone dust collector 101 separates and collects contaminants from the sucked dust-laden air. The multi-cyclone dust collector 101 employs a first cyclone unit 10 (see FIG. 3) that separates and collects comparatively large contaminants, and a second cyclone unit 50 (see FIG. 3) that separates and collects fine contaminants. The structure and operation of the multi-cyclone dust collector 101 is the same as the multi-cyclone dust collector 1 described above, so a detailed description thereof is not repeated for conciseness.

Therefore, upon turning on the vacuum cleaner 100 and then moving the suction brush 110, contaminants on a cleaning floor are sucked into the dust suction opening of the suction brush 110 by suction force of the vacuum generator 131. The contaminants sucked through the dust suction opening enter the multi-cyclone dust collector 101 through the extension pipe 121 and the flexible hose 122. The contaminants entered the multi-cyclone dust collector 101 are separated and collected by the first and second cyclone units 10 and 50. Clean air discharges out of the cleaner body 130.

In the above description, a canister type vacuum cleaner is used as an example of vacuum cleaners employing the multi-cyclone dust collector according to an embodiment of the present invention; however, this should not be considered as limiting. Various types of vacuum cleaners such as an upright type vacuum cleaner may employ the multi-cyclone dust collector according to an embodiment of the present invention.

While the embodiments of the present invention have been described, additional variations and modifications of the embodiments may occur to those skilled in the art once they learn of the basic inventive concepts. Therefore, it is intended that the appended claims shall be construed to include both the above embodiments and all such variations and modifications that fall within the spirit and scope of the invention.

What is claimed is:

1. A multi-cyclone dust collector for a vacuum cleaner, comprising:

a first cyclone unit causing dust-laden air sucked into a lower portion of the first cyclone unit to form a first upwardly whirling air current so as to separate contaminants from the dust-laden air by centrifugal force and to cause partially clean air, from which the contaminants are removed, to discharge downwards; and a second cyclone unit disposed under the first cyclone unit, the second cyclone unit causing the partially clean air, which is downwardly discharged from the first cyclone unit, to enter into a lower portion of the second cyclone unit, to form a second upwardly whirling air current so as to separate fine contaminants from the partially clean air by centrifugal force, and to cause clean air, from which the fine contaminants, are removed to discharge downwards, wherein the first cyclone unit comprises:

a first cyclone body formed in a hollow cylindrical shape, for the dust-laden air to whirl inside the first cyclone body;

an air communicating member formed in a hollow cylindrical shape, the air communicating member protruded upward from a center of a partition of the first cyclone body, the air communicating member discharging the partially clean air removed of contaminants to the second cyclone unit;

a first dust chamber formed to wrap around the first cyclone body, the first dust chamber collecting contaminants discharged from the first cyclone body, the first dust chamber formed in a space between a sidewall of the first cyclone body and a first dust receptacle; and an air inlet pipe disposed at a lower portion of the first cyclone body, the air inlet pipe causing the dust-laden air to form the first upwardly whirling air current.

2. The multi-cyclone dust collector of claim 1, wherein the air inlet pipe is disposed in a tangential direction to the first cyclone body through the first dust chamber and in fluid communication with the first cyclone body.

3. The multi-cyclone dust collector of claim 1, wherein the first cyclone body further comprises a dust discharge opening disposed on an upper portion of a sidewall of the first cyclone body for the contaminants separated from the dust-laden air to be discharged to the first dust chamber through the dust discharge opening.

4. The multi-cyclone dust collector of claim 1, wherein the air communicating member has an upper end extending to an upper surface of the first cyclone body and a plurality of air holes formed on a surface of the air communicating member for discharging the partially clean air.

5. The multi-cyclone dust collector of claim 1, wherein the first cyclone body and the air communicating member are integrally molded by injection molding.

6. The multi-cyclone dust collector of claim 1, wherein the second cyclone unit comprises:

a second cyclone in fluid communication with a bottom end of the air communicating member, the second cyclone causing the partially clean air entering through the air communicating member to form the second upwardly whirling air current, wherein the second upwardly whirling air current is comprised of a plurality of upwardly whirling air currents so as to separate contaminants from the partially clean air; and a second dust chamber wrapping around the second cyclone for collecting fine contaminants discharged from the second cyclone.

7. The multi-cyclone dust collector of claim 6, wherein the second cyclone comprises:

an air guide pipe connected with the air communicating member and having a plurality of distribution paths at a lower side thereof;

a plurality of second cyclone bodies formed in a hollow cylindrical shape with a closed bottom end, a lower portion of the plurality of second cyclone bodies connected with each of the plurality of distribution paths; and a plurality of air outlet pipes formed in a hollow cylindrical shape, the air outlet pipes protruded upward from a center of a lower surface of each of the plurality of second cyclone bodies, the air outlet pipes discharging air cleaned in each of the plurality of second cyclone bodies.

8. The multi-cyclone dust collector of claim 7, wherein the second cyclone unit further comprises an air gathering member disposed under the plurality of second cyclone bodies and gathering air discharged from the plurality of air outlet pipes.

9. The multi-cyclone dust collector of claim 7, wherein the plurality of second cyclone bodies are arranged in a substantially circular shape based on the air guide pipe.

10. The multi-cyclone dust collector of claim 7, wherein the second cyclone is integrally molded by injection molding.

11. The multi-cyclone dust collector of claim 6, wherein each of the first and second dust chamber has a detachably mounted dust cover on a bottom end thereof.

12. A vacuum cleaner comprising:

a vacuum generator generating suction force;

a suction brush sucking dust-laden air by the suction force;

a multi-cyclone dust collector separating and collecting contaminants from the air sucked through the suction brush;

wherein the multi-cyclone dust collector comprises:

a first cyclone unit in fluid communication with the suction brush at a lower portion of the first cyclone unit, the first cyclone unit causing the dust-laden air to form a first upwardly whirling air current so as to separate contaminants from the dust-laden air by centrifugal force and to cause partially clean air, from which the contaminants are removed, to discharge downwards; and a second cyclone unit disposed under the first cyclone unit, the second cyclone unit causing the partially clean air, which is downwardly discharged from the first cyclone unit and then sucked into a lower portion of the second cyclone unit, to form a second upwardly whirling air current so as to separate fine contaminants from the partially clean air by centrifugal force, and to cause clean air, from which the fine contaminants, are removed to discharge downwards, wherein the first cyclone unit comprises:

a first cyclone body formed in a hollow cylindrical shape, for the dust-laden air to whirl inside the first cyclone body;

an air communicating member disposed on a center of a partition of the first cyclone body, the air communicating member discharging the partially clean air removed of contaminants to the second cyclone unit;

a first dust chamber formed to wrap around the first cyclone body, the first dust chamber collecting contaminants discharged from the first cyclone body, the first dust chamber formed in a space between a sidewall of the first cyclone body and a first dust receptacle; and an air inlet pipe disposed at a lower portion of the first cyclone body, the air inlet pipe causing the dust-laden air to form the first upwardly whirling air current.

13. The vacuum cleaner of claim 12, wherein the second cyclone unit comprises:

an air guide pipe connected with the air communicating member and having a plurality of distribution paths at a lower side thereof;

a plurality of second cyclone bodies formed in a hollow cylindrical shape with a closed bottom end, a lower portion of the plurality of second cyclone bodies connected with each of the plurality of distribution paths;

a plurality of air outlet pipes formed in a hollow cylindrical shape, the air outlet pipes protruded upward from a center of a lower surface of each of the plurality of second cyclone bodies, the air outlet pipes discharging air cleaned in each of the plurality of second cyclone bodies; and a second dust chamber wrapping around the plurality of second cyclone bodies and collecting fine contaminants discharged from the plurality of second cyclone bodies.

* * * * *